W. A. FIFIELD.
WINDMILL GOVERNOR.
APPLICATION FILED DEC. 9, 1908.
932,260.
Patented Aug. 24, 1909.
2 SHEETS—SHEET 2.
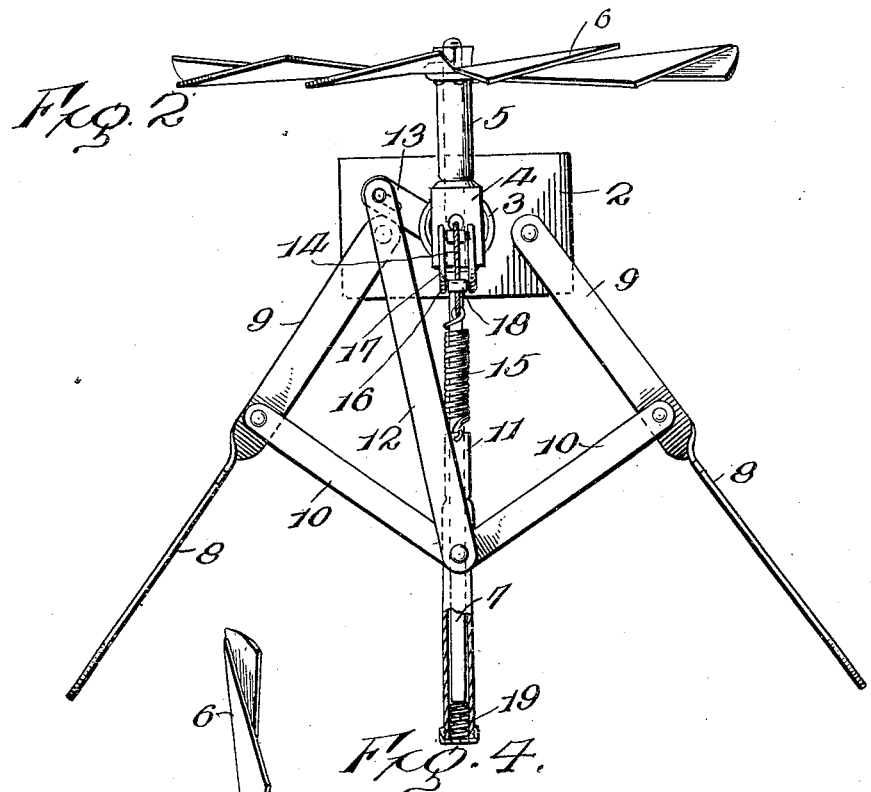
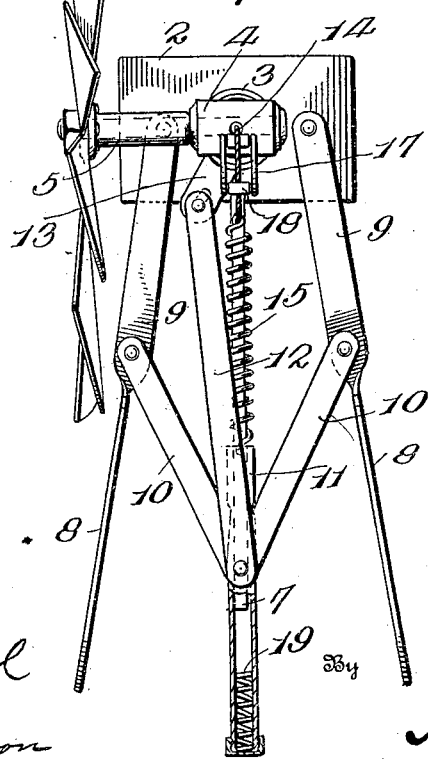
Witnesses
Inventor
W. A. Fifield
By
Attorneys

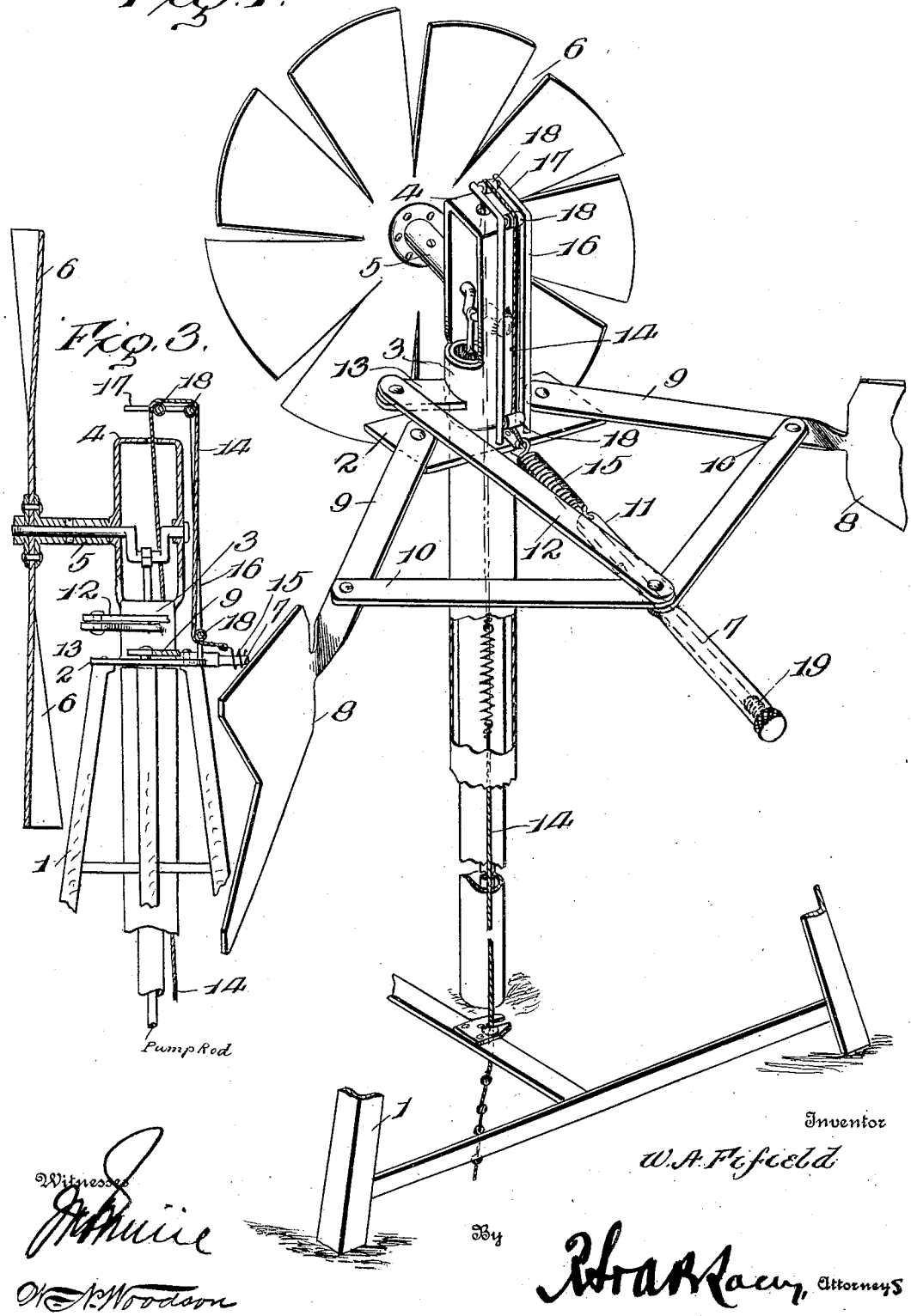

UNITED STATES PATENT OFFICE.

WILLIAM A. FIFIELD, OF GLENBURN, NORTH DAKOTA.

WINDMILL-GOVERNOR.

932,260.  Specification of Letters Patent.  Patented Aug. 24, 1909.

Application filed December 9, 1908. Serial No. 466,727.

*To all whom it may concern:*

Be it known that I, WILLIAM A. FIFIELD, citizen of the United States, residing at Glenburn, in the county of Ward and State of North Dakota, have invented certain new and useful Improvements in Windmill-Governors, of which the following is a specification.

This invention relates to the type of motors utilizing air currents for developing available energy to be used in the industrial arts, the purpose being to combine with this class of motors means for controlling the power according to the load or work to be performed within the capacity of the engine.

A further purpose of the invention is to devise novel mountings for a pair of governor vanes to admit of the latter remaining full in the wind at all times, a variable resistance being interposed in the connections to adapt the governor mechanism to conditions and to the amount of force to be developed and expended to effect the purpose desired.

For a full understanding of the invention and the merits thereof and also to acquire a knowledge of the details of construction and the means for effecting the result, reference is to be had to the following description and accompanying drawings, in which:

Figure 1 is a perspective view of a wind wheel embodying the invention; Fig. 2 is a top plan view thereof, the dotted lines indicating an adjusted position of the governor vanes and wind wheel: Fig. 3 is a vertical central section. Fig. 4 is a top plan view of the device showing the same in angular adjustment.

Corresponding and like parts are referred to in the following description and indicated in all the views of the drawings by the same reference characters.

The numeral 1 designates a tower or support, such as commonly provided in connection with wind mills, to sustain the working parts. A plate 2 is provided with a tubular spindle 3 which is mounted in the upper portion of the tower to admit of the plate turning to adapt the engine or wind mill to the direction of air current, so as to utilize the maximum amount of force thereof. The head 4 of the wind mill is provided with a tubular spindle 5 which is mounted in the upper portion of the tower at right angles to the tubular spindle 3, thereby admitting of the parts 2 and 4 having an independent rotary movement about a vertical axis. The wind wheel 6 may be of any structural type and is mounted in the head 4, so as to turn freely about a horizontal axis. The particular construction of the head 4, the wind wheel 6 and the mountings of the latter are immaterial within the purview of the present invention and are illustrated simply to demonstrate the application and workings of the governor mechanism.

A guide 7 projects horizontally from the plate 2 and has rigid connection therewith and is at right angles to the axis about which the wind mill turns in adapting itself to the various air currents. The guide 7 may consist of a rod, bar or other device so long as it serves the purpose of maintaining the governor vanes in definite relationship to each other and to the vertical axis of the wind mill. The governor vanes 8 have their arms 9 pivotally connected to the plate 2 upon opposite sides of the axis of the wind mill. Links 10 are pivotally connected at their outer ends to the arms 9 and their inner ends are pivotally connected to each other and to a slide 11 mounted upon the guide 7. The links 10 incline outwardly and rearwardly in an opposite direction to the inclination of the arms 9. The slide 11 is in the form of a sleeve which encircles the rod or bar 7. The arrangement of the parts is such that the vanes 8 always occupy a like position upon opposite sides of the guide 7, hence each receives and sustains a like pressure of the wind. A link 12 connects the slide 11 with an arm 13 projected from the head 4. As the slide 11 moves toward and from the vertical axis of the wind mill, the rod 4 and the wind wheel 6 mounted thereon turns thereby causing the wind wheel to present more or less surface to the direct action of the wind. A cord or rope 14 extends to within convenient reach of the ground and has connection with the slide 11 and this cord or rope admits of spreading the governor vanes to a greater or less extent. The lower end of the cord or rope 14 may be secured in any manner. It is contemplated to fasten the cord or rope 14 in an adjusted position, so as to hold the governor vanes spread the required distance. A yielding connection such as a spring 15 is interposed in the length of the cord or rope 14, so as to cause the governor vanes to yield when subjected to the variable resistance. By pulling upon the cord or rope 14 it is understood that the governor vanes may be held in the wind by a greater or less resistance represented by the tension of the spring 15, thereby holding the wind wheel in the wind to a greater or less extent, depending upon the degree of power to be utilized. The spring 15 may be mounted upon the guide 7, as indicated most clearly in the several views or it may be interposed directly in the length of the cord or rope, as indicated in Fig. 3. A standard 16 is located at the rear side of the plate 2 and extends upwardly and is provided at its top with an over-hanging portion 17. Guide pulleys 18 are located near the lower end of the standard 16 and at or near opposite ends of the over-hanging portion 17, so as to give proper direction to the cord or rope 14 and thereby enable direct application of the restraining force exerted by the cord or rope 14 to be applied to the slide 11 for controlling the governor vanes 8.

From the foregoing it will be understood that the guide 7 is in line with the vertical axis of the wind mill and by reason of the slide 11 and the links 10 between said slide and the arms of the governor vanes, the latter are at all times held an equal distance from opposite sides of said guide, hence each governor vane sustains an equal pressure. When the governor vanes are spread to their full extent, the wind wheel presents a maximum surface for the action of the wind, but as the governor vanes approach each other by the action of the wind, the wind wheel 6 is turned so as to present a less extent of surface to the action of the wind, as will be readily understood on reference to the dotted lines of Fig. 2. The effective tension of the spring or yielding connection 15 may be adjusted to hold the governor vanes in the wind with a greater or less degree of resistance, hence the power and speed of the wind wheel may be regulated within certain limits, according to the load or work and the force of the wind. It is further observed that the guide 7 and the governor vanes always remain in the wind, thereby enabling full force of the air currents to be expanded upon the governor vanes, so as to control the wind mill.

It is further observed that the slide 11 is or may be of sufficient length to admit of the insertion into the rear end of said slide a short coil spring 19 that will come in contact with the rear end of the guide 7 when the governor vanes 8 have spread the required distance to turn the wind wheel the maximum surface to the wind, thus forming a cushion stop for the vanes which would remove any possible jar, which might occur by the mill being suddenly turned into the wind.

Having thus described the invention, what is claimed as new is:

1. In combination a wind wheel, a mounting for said wind wheel arranged to turn about a vertical axis and having an arm projected therefrom, a guide at right angles to said vertical axis, a slide mounted on said guide, governor vanes arranged upon opposite sides of the guide, links connecting the governor vanes with said slide, connecting means between the slide and arm extended from the wind wheel mounting, a spring mounted upon said guide and having connection with said slide, and an operating cord having connection with said spring and extended within convenient reach to be drawn upon and secured to vary the effective tension of the spring cord to the resistance which the governor vanes are to offer to the action of the wind.

2. In combination a wind wheel, a mounting for said wind wheel arranged to rotate about a vertical axis, an arm projected from said mounting for rotating the same, a guide disposed adjacent said mounting adapted to be actuated by the wind, means connecting said arm and said guide to communicate motion between the same and means for tensionally adjusting the guide proportionately to the wind pressure.

In testimony whereof I affix my signature in presence of two witnesses.

WILLIAM A. FIFIELD. [L. S.]

Witnesses:
R. GILBERTSEN,
B. W. GREEN.